US008062561B2

(12) United States Patent
Jumas et al.

(10) Patent No.: US 8,062,561 B2
(45) Date of Patent: Nov. 22, 2011

(54) NEGATIVE ELECTRODE COMPOSITE MATERIAL, PRODUCTION METHOD, NEGATIVE ELECTRODE AND LITHIUM-ION BATTERY

(75) Inventors: Jean-Claude Jumas, Jacou (FR); Pierre-Emmanuel Lippens, Saint-Aunès (FR); Josette Olivier-Fourcade, Jacou (FR); Florent Robert, Pardailhan (FR); Patrick Willmann, Montgiscaro (FR)

(73) Assignees: Centre National d'Etudes Spatiales (FR); Central National de la Recherche Scientifique (FR); Universite de Montpellier II (FR)

(*) Notice: Subject to any disclaimer, the term of this patent is extended or adjusted under 35 U.S.C. 154(b) by 1235 days.

(21) Appl. No.: 11/572,889

(22) PCT Filed: Jul. 28, 2005

(86) PCT No.: PCT/FR2005/050627
§ 371 (c)(1),
(2), (4) Date: Jan. 29, 2007

(87) PCT Pub. No.: WO2006/021714
PCT Pub. Date: Mar. 2, 2006

(65) Prior Publication Data
US 2008/0003502 A1    Jan. 3, 2008

(30) Foreign Application Priority Data

Jul. 30, 2004  (FR) ..................................... 04 51742

(51) Int. Cl.
*H01B 1/02* (2006.01)
(52) U.S. Cl. ................ 252/519.54; 429/218.1; 429/223; 429/231.95; 419/19

(58) Field of Classification Search ............... 252/182.1, 252/521.5, 519.54; 429/218.1, 223, 231.95; 419/19
See application file for complete search history.

(56) References Cited

U.S. PATENT DOCUMENTS
6,004,695 A * 12/1999 Goda et al. ................. 429/218.1
(Continued)

FOREIGN PATENT DOCUMENTS
EP       0 823 741        11/1998
(Continued)

OTHER PUBLICATIONS

Idota et al. "Tin-Based Amorphous Oxide: A High-Capacity Lithium-Ion-Storage Material," Science, vol. 276, May 30, 1997, pp. 1395-1397.

(Continued)

*Primary Examiner* — Khanh T Nguyen
(74) *Attorney, Agent, or Firm* — Hayes Soloway P.C.

(57) ABSTRACT

A negative electrode material, a method for producing this material, and to a negative electrode and a lithium-ion battery comprising this material are described. The material comprises an active phase consisting of a material M based on Al, Si, Sn, Sb or a mixture thereof, and a support phase consisting of a material $X_aY_bO_c$, where: O is an oxygen; Y is a cation with oxidation degree m=3, 4, 5 or 6; X is a cation with oxidation degree d=1, 2, 3, 4 or 5, X ensuring the electroneutrality of $X_aY_bO_c$; and where: c is such that $2 \leq c \leq 10$; b is such that $1 \leq b \leq 4$; and $a=(2c-bm)/d$. An interface of mixed composition exists between the $X_aY_bO_c$ material and the active phase M, the interface consisting of the elements M, X, Y and O.

16 Claims, 10 Drawing Sheets

U.S. PATENT DOCUMENTS

| | | | |
|---|---|---|---|
| 2003/0180619 A1 | 9/2003 | Tamura et al. | 429/231.95 |
| 2004/0234859 A1* | 11/2004 | Lee et al. | 429/231.95 |
| 2004/0262571 A1* | 12/2004 | Barker et al. | 252/182.1 |
| 2006/0057463 A1 | 3/2006 | Gao et al. | 429/231.95 |

FOREIGN PATENT DOCUMENTS

| | | |
|---|---|---|
| EP | 1 317 013 | 4/2003 |
| EP | 1 735 859 | 12/2006 |
| WO | WO 2006/078269 | 7/2006 |

OTHER PUBLICATIONS

Besenhard et al. "Will advanced lithium-alloy anodes have a chance in lithium-ion batteries?", Journal of Power Sources, vol. 68, 1997, pp. 87-90.

Courtney et al. "On the Aggregation of Tin in SnO Composite Glasses Caused by the Reversible Reaction with Lithium", Journal of the Electrochemical Society, vol. 146, 1999, pp. 59-68

Goward et al. "Electrochemical and multinuclear solid-state NMR studies of tin composite oxidge glasses as anodes for Li ion batteries", Journal of MaterialsChemistry, 2000, pp. 1240-1249.

Chouvin et al. "Deeper insight on the lithium reaction mechanism with amorphous tin composite oxides", Solid State Sciences, vol. 6, 2004, pp. 39-46.

Winter et al. "Electrochemical lithiation of tin and tin-based intermetallics and composites", Electrochimica Acta, vol. 45, 1999, pp. 31-50.

X9002394818, Hong Li et al., J. Electrochem. Soc., 148(8), A915, 2001, Jul. 5, 2001, "Studies on Capacity Loss and Capacity Fading of Nanosized SnSb Alloy Anode for Li-Ion Batteries".

European Search Report dated Nov. 5, 2007 in Appln No. 05 794 993.5-1227 (4 pgs).

* cited by examiner

NEGATIVE ELECTRODE COMPOSITE MATERIAL, PRODUCTION METHOD, NEGATIVE ELECTRODE AND LITHIUM-ION BATTERY

TECHNICAL FIELD

This invention relates to a negative electrode composite material, a method for producing this material, and a negative electrode and a lithium-ion battery comprising this material.

In particular, this invention relates to a negative electrode material usable in rechargeable lithium-ion batteries.

In the description below, the references in square brackets ([.]) refer to the list of references after the examples.

PRIOR ART

Negative electrode materials for lithium-ion batteries are generally carbon based materials.

Due to the limits of the volumetric and gravimetric capacitances and in order to limit the risks incurred by the formation of dendrites, interest has recently focused on other materials.

Particular attention has been paid for example to tin based materials. The basic mechanism is the reversible formation of Li—Sn intermetallic phases with low potential, that is, generally between 0.2 and 0.6 V with regard to the potential of lithium metal, which serves in principle for the intercalation and/or deintercalation of lithium up to a maximum of 4.4 Li/Sn (molar).

Unfortunately, these wide variations in volume, greater than 100%, due to the reactions associated with the intercalation and deintercalation, sharply limit the performance of the electrode, thereby, for example, preventing the use of electrodes consisting of pure tin.

In order to improve the mechanical stability of the electrodes by limiting the variations in volume, the use of small tin particles obtained, for example, by electroplating on copper substrates, has been proposed by J. O. Besenhard and al. in the document [1]. However, the thickness of the layer of tin particles was too low to be usable in practice.

Most of the tin based materials are formed from an electrochemically active compound based on tin, dispersed in an inactive matrix limiting the expansion of the active material. The most common example is the amorphous tin composite oxide (TCO) which has been proposed by Fuji Photo Film CO., LTD described in the documents [2] and [3]. The basic formula of TCO can be written as $SnM_xO_y$, where M is a metal element such as B(III), Al(III) and P(V). The electrochemically active centres are the atoms of Sn(II) bound to the oxygen atoms and dispersed in the matrix. The insertion of lithium first leads to the irreversible conversion of Sn(II) to Sn(O) followed by the reversible electrochemical formation of Li—Sn alloys with a maximum stoichiometry corresponding to $Li_{4.4}Sn$.

This mechanism has been investigated by various techniques such as X-ray diffraction described for example by I. A. Courney and al. in the document [4]; by nuclear magnetic resonance (NMR) described for example by G. R. Goward and al. in document [5]; and by Mössbauer spectroscopy described for example by J. Chouvin and al. in document [6]. The gravimetric and volumetric capacitances mainly depend on the composition of the glass matrix, the particle size and the preparation of the electrode material. They are generally higher than those of the carbon based materials. The best performances appear to be 600 mAh/g and 2200 mAh/cm³ respectively for the gravimetric and volumetric capacitances, as indicated in Y. Idota and al. [3].

However, these materials have an irreversible capacitance of about 400 mAh/g at the first discharge, which limits the performance of the batteries that may be produced using these materials.

There are in fact two main problems with TCO: the non reversible high loss of the capacitance due to the reaction of Li with Sn(II) yielding Sn(0) during the first charge cycle, and the low cyclability (number of charge/discharge cycles) in comparison with carbon based anodes, due to the aggregation of the tin as described by I. A. Courney and al. [4].

Other tests on crystalline materials based on tin oxide, such as SnO and $SnO_2$, have been performed. They demonstrate the same drawbacks with an even lower cyclability, as reported by M. Winter and J. O. Besenhard in document [7].

Hence a real need exists to find new negative electrode materials, usable particularly for producing rechargeable lithium-ion batteries, which do not have the abovementioned drawbacks of the materials of the prior art.

SUMMARY OF THE INVENTION

This invention relates precisely to a negative electrode material which meets the abovementioned need. In fact, the material of this invention particularly has a low reversibility, a low first cycle capacitance loss, and an excellent cyclability (number of charge/discharge cycles).

The material of this invention comprises an active phase consisting of a material M based on Al, Si, Sn, Sb or a mixture thereof, and a support phase consisting of a material $X_aY_bO_c$, where:

O is an oxygen;
Y is a cation with oxidation degree m=3, 4, 5 or 6;
X is a cation with oxidation degree d=1, 2, 3, 4 or 5, X ensuring the electroneutrality of $X_aY_bO_c$; and where:
c is such that $2 \leq c \leq 10$;
b is such that $1 \leq b \leq 4$; and
a=(2c−bm)/d;
an interface of mixed composition existing between the active phase and the support phase, the said interface consisting of the elements M, X, Y and O.

The originality of this invention resides in the nature of the negative electrode material, which consists of a material having the formula $X_aY_bO_c$ constituting the support phase, electrochemically inactive, in interaction with an active phase based on tin, and/or of silicon and/or aluminium and/or antimony, thanks to an interface of mixed composition issued from the components M and $X_aY_bO_c$. This interface of mixed composition generates an adhesion, that is, that it maintains a cohesion between the active phase M and the support phase $X_aY_bO_c$, and serves particularly to absorb the volumetric variations of the active phase. It further confers to the material of the invention its particular properties described herein.

In the context of this invention, "cycling behaviour" or "cyclability" means the property of preservation of the gravimetric and volumetric capacitances during several electrochemical cycles.

In the context of this invention, "electrochemical cycle" means a cycle comprising:

a discharge step; movement from the negative electrode to the positive electrode of positive ions $Li^+$ inside the battery in the electrolyte and of electrons outside the battery; and a charge step; movement from the positive electrode to the negative electrode of positive ions $Li^+$ inside the battery in the electrolyte and of electrons outside the battery.

In the context of this invention, "active phase" means a crystalline or amorphous phase whereof one or more elements are reversibly involved in the conversion of chemical energy to electrical energy (electrochemical reaction).

In the context of this invention, "interface" means a crystalline or amorphous phase located between the active phase M and the inactive phase which forms the support material $X_aY_bO_c$.

In the context of this invention, "mixed composition" means the composition involving the elements of the active phase M and the inactive phase $X_aY_bO_c$.

In the context of this invention, "support" means a lattice of atoms which is not directly involved in the electrochemical conversion and which supports the active species via the interface of mixed composition. This is a crystalline or amorphous phase.

In the context of this invention, "anionic lattice agent" means an element providing the structure of the support lattice by the formation of mainly covalent bonds with oxygen.

In the context of this invention, "lattice or counter-ion modifier" means an element modifying the dimensionality of the support lattice by the formation of mainly ionic bonds. The modifier ensures charge compensation.

In this invention, X is preferably a lattice modifier for modifying the dimensionality creating unbridged ionic bonds with the oxygen and acting on the ionic conductivity. X may be a cation selected for example from alkaline elements (for example $Li^I$, $Na^I$), alkaline earth elements (for example $Mg^{II}$, $Ca^{II}$), transition elements having oxidation degree between 1 and 5 (such as Ti, V, Mn, Fe, Co, Ni, Cu, Ag), elements p with oxidation degree 3 or 5 (such as $B^{III}$, $Al^{III}$, $P^V$, $In^{III}$) or a combination thereof.

In this invention, Y is preferably a lattice agent acting on the electronic conductivity and enabling the formation in the material of the invention of:

(i) anionic complexes having the formula $(Y_bO_c)^n$ based on tetrahedral units $YO_4$, where $n=bm-2c \leq 0$ with $1 \leq b \leq 4$, with m, the oxidation degree of Y, equal to 3, 4, 5 or 6, and with $2 \leq c \leq 10$; and/or (ii) continuous mono- bi- or three-dimensional continuous lattices formed of infinite sequences of anionic entities $(Y_bO_c)^n$, with Y, b, c and n such as defined above.

These complexes and/or lattices may therefore be present in the negative electrode material of the invention.

According to the invention, the tetrahedral complexes may be condensed according to the formula $Y_bO_c$ with $1 \leq b \leq 4$, and $2 \leq c \leq 10$. This may concern, for example, $YO_4$, $Y_2O_7$, $Y_3O_9$, $Y_4O_{10}$, or a mixture thereof.

According to the invention, Y may be selected for example from $B^{III}$, $Al^{III}$, $Si^{IV}$, $Ge^{IV}$, $P^V$, $Sb^V$, $S^{VI}$ or a combination thereof.

According to the invention, M is such as defined above. In this invention, "M" is obviously understood as M°, that is, as the metallic form of the metal. In the context of this invention, "metal based on" means "consisting of" (metal alone) or "comprising" (for example an alloy comprising this metal). As a non-limiting example, when M is Sn, then X, Y, a, b and c may be such as: X=B, Y=P, a=1, b=1, c=4.

According to the invention, the molar proportion $[M]/[X_aY_bO_c]$ in the negative electrode material is preferably between 0.1 and 100, generally between 0.1 and 10. This molar proportion may be for example between 1 and 5 for the materials of the invention presented as examples.

The negative electrode material of the invention may for example be a material comprising an active phase M based on Sn, Si or Al or a mixture thereof in interaction with a support phase $BPO_4$, an interface of mixed composition existing between these two phases, the said interface consisting of the elements M, B, P and O. In this example, for illustration only, when M is Sn, the molar proportion $[M]/[BPO_4]$ is for example between 1 and 5, for example 2.5.

According to the invention, in the active phase M, the elements Al, Si, Sn and Sb may be combined with carbon in a molar proportion of up to 1:1 (corresponding to $[C]/[M] \leq 1$). In fact, the inventors have observed that the presence of carbon in the active phase can help to improve the performance of the negative electrode material of the invention, particularly if M is Si. This effect can certainly be observed for other elements than Si.

This invention further relates to a method for producing the material of the invention, said method comprising the following steps:

mixing of the oxide precursors of X and Y;

first heat treatment of the mixture of oxide precursors of X and Y to obtain the material $X_aY_bO_c$;

cooling then grinding of the material $X_aY_bO_c$ obtained;

mixing of the ground material $X_aY_bO_c$ obtained with the active phase M;

second heat treatment carried out under non-oxidizing atmosphere for the material M and at a temperature below the melting point of the material $X_aY_bO_c$ and sufficiently high so that the material M reacts chemically with $X_aY_bO_c$ to form the said interface between the said active phase and the said support phase and thereby to obtain the said negative electrode material; and cooling of the said negative electrode material obtained.

In this method, X, Y, a, b, c and M are such as defined above.

According to the invention, the mixture of oxide precursors of X and Y may be prepared by simple mixing of the powders of these precursors. These precursors may be defined as being organic and/or inorganic compounds capable of forming ME-C-ME bonds, where ME is a metal, by condensation or hydrolysis/condensation (sol-gel method). By way of example, mention can be made of carbonates (for example $Li_2CO_3$), acetates $ME-CH_3CO_2)_n$, hydroxides (ME-OH), chlorides (for example $AlCl_3$), nitrates $Ca(NO_3)_2$, silicates $Li_2Si_2O_5$, ME-oxoalkoxides (for example such as $ME(OR)_n$ with ME selected for example from Al, Ti, Zn, et R═OH), tetraethoxysilane (TEOS), etc. This list is certainly not exhaustive, but a person skilled in the art will know how to complete it evidently from the details provided in the present description.

According to the invention, the oxide precursor of X may for example be $B_2O_3$ and/or $H_3BO_3$, and the oxide precursor of Y may be for example $P_2O_5$ and/or $NH_4H_2PO_4$. In this case, the support phase $X_aY_bO_c$ produced is $BPO_4$ and, in the obtained material of the invention, the interface of mixed composition consists of the elements M, B, P and O.

The proportion of each of the oxides in the mixture of precursors is obviously the stoichiometric proportion suitable for obtaining the material $X_aY_bO_c$ defined above. These oxides of X and Y are available commercially. They may be for example in the case of a support phase $BPO_4$, all combinations between, on the one hand $B_2O_3$ and $H_3BO_3$, and on the other hand, $P_2O_5$ and $NH_4H_2PO_4$.

According to the invention, the mixture of oxide precursors of X and Y may be ground, for example in a mortar, in order to homogenize the mixture.

According to the invention, the first heat treatment is suitable for obtaining the material $X_aY_bO_c$. For carrying out this treatment, the mixture can be heated to a temperature of 100 to 1200° C. For example, tests on $BPO_4$ have shown for this material that the temperature of the first heat treatment is preferably between 300° C. and 1000° C., preferably between 500° C. and 800° C., to obtain good crystallinity.

The heating of the mixture of precursors at the temperature selected is preferably carried out after a temperature rise of between 1° C./minute and 20° C./minute, preferably between 1° C./minute and 5° C./minute. The temperature rise is preferably not too rapid to avoid a sudden liberation of $NH_3$, for example for a precursor such as $NH_4H_2PO_4$, and favour the reaction between the oxide precursors of X and Y.

The mixture of precursors can be maintained at the heat treatment temperature for a period of 2 to 12 hours. For example, in the case of a precursor such as $NH_4H_2PO_4$, it is maintained at this temperature preferably for a minimum period of 3 hours in order to promote a possible liberation of $NH_3$ and permit a complete reaction between the oxide precursors of X and Y. A period of 6 hours is for example sufficient for good homogenization of the compound, but a longer period can be used. Thus, for example, a period of 3 to 6 hours appears to be advantageous for producing a material $BPO_4$.

The material $X_aY_bO_c$ obtained is then cooled, for example, by allowing it to rest at ambient temperature.

According to the invention, the step of grinding the material $X_aY_bO_c$ is preferably carried out in order to obtain a particle size distribution of micrometric (microparticles) and/or nanometric (nanoparticles) size. The grinding may be a mechanical grinding (for example ball mill) or manual (for example in a mortar). Microparticles mean particles with a size generally between 0.1 and 100 μm. The size of the nanoparticles is generally smaller than 100 nanometres.

The material $X_aY_bO_c$ is then mixed with the active material M. The material M is preferably in powder form, preferably having a particle size distribution equivalent to that of the material $X_aY_bO_c$.

The second heat treatment, according to the method of the invention, is suitable for creating the interface of mixed composition between the material $X_aY_bO_c$ and the active phase M. This interface is defined above. It is in the form of a compound or a mixture consisting of the elements M, X, Y and O whereof the physicochemical properties have not yet been determined. The inventors believe it is an amorphous material. The essential condition for obtaining this interface is the temperature used for this second heat treatment.

In this second heat treatment, the mixture is hence heated to a sufficiently high temperature to form the said interface between the material $X_aY_bO_c$ and the active phase M and sufficiently low to avoid the melting of $X_aY_bO_c$. Furthermore, the heating time of this second heat treatment is preferably sufficient for good homogenization and a complete reaction, but not too long to prevent the formation of metallic M.

According to the invention, the second heat treatment is generally advantageously carried out at a temperature of between 100 and 1200° C., for a period of 2 to 12 hours.

For example, tests have shown that the optimal range is between 300° C. and 600° C. when $X_aY_bO_c$ is $BPO_4$ and M is Sn. For example, tests have shown that the heating time is advantageously between 4 hours and 8 hours when $X_aY_bO_c$ is $BPO_4$ and M is Sn.

According to the invention, in general, the second heat treatment is preferably carried out under a non-oxidizing atmosphere for M. This is preferably an inert atmosphere, for example of argon and/or nitrogen, preferably dry to avoid the oxidation of M. The atmosphere may advantageously be slightly reducing with a low hydrogen content, preferably 5%. The atmosphere is therefore preferably controlled.

According to the invention, the negative electrode material obtained can be cooled for example, by quenching, for example at ambient temperature, preferably under controlled atmosphere to avoid oxidation, for example as described above.

This invention therefore relates to a novel class of negative electrode materials usable to produce lithium-ion batteries particularly having the following characteristics:
- a gravimetric capacitance higher than that of graphite (372 mAh/g); and
- a volumetric capacitance higher than that of graphite (837 mAh/cm$^3$).

The production method of the invention and the material obtained serve, in the rechargeable lithium-ion battery application:
- to improve the performance and gravimetric and volumetric capacitances with regard to the negative electrodes based on carbon, tin, silicon, aluminium, and antimony of the prior art;
- to obtain a low service voltage, good reversibility, low first cycle capacitance loss and excellent cyclability (intercalation and deintercalation of Li). This material preserves a high retention capacity after several cycles.

The method for producing the material is rapid and can be implemented at reduced cost.

Furthermore, this invention provides for greater safety and greater respect for the environment.

This invention hence also relates to a negative electrode of a rechargeable lithium-ion battery comprising the negative electrode material of the invention. Such an electrode finds an application in lithium-ion batteries.

This invention hence relates also to a rechargeable lithium-ion battery comprising at least one positive electrode, at least one negative electrode, and an electrolyte, the said battery being characterized in that the said at least one negative electrode comprises a negative electrode material according to this invention.

To produce a lithium-ion battery according to the invention, use can be made of any one of the methods known to a person skilled in the art, by simply replacing the negative electrode material of the prior art by a material according to this invention.

The document [3] describes examples of production protocols for lithium-ion batteries and the materials usable to produce a lithium-ion battery according to this invention. It suffices to replace the negative electrode materials described in this document by a material according to this invention.

With regard to the document [3], other positive electrode materials are also usable in this invention to produce a lithium-ion battery. For example, mention can be made of $LiFePO_4$, $LiCoO_2$, substituted $LiCoO_2$ (obtained by partial substitution of Co such as $Li(CoNiMn)O_2$), $LiMn_2O_4$.

The electrolyte provides the transport of the $Li^+$ ions between the electrodes of the battery. The usable electrolytes in lithium-ion batteries of this invention are those known to a person skilled in the art. For example, mention can be made of:
- liquids such as $LiPF_6$+solvent—examples of solvents: ethylene carbonate/propylene carbonate (EC/PC in proportions 1:1); ethylene carbonate/diethyl carbonate (EC/DEC in proportions 1:1); propylene carbonate/ethylene carbonate/dimethyl carbonate (PC/EC/DMC in proportions 1:1:3);
- polymers such as $LiXF_6$ (where X=P, As, Sb)+$P(EO)_6$ (polyethylene oxide);
- solids such as LiBOB.

EXAMPLES

Example 1

Production of a Material According to the Invention Based on Sn and $BPO_4$

In this example, the negative electrode material is synthesized by the ceramic method using $BPO_4$ and βSn.

For the synthesis of $BPO_4$, the two precursors $H_3BO_3$ and $NH_4H_2PO_4$ are mixed in stoichiometric proportions and the mixture is ground in an agate mortar for homogenization. The mixture obtained is placed in an aluminium crucible and heated (first heat treatment), after a temperature rise of 1° C./min, to 300° C. for a period of three hours to obtain a possible liberation of $NH_3$ issuing from the precursor $NH_4H_2PO_4$ and to permit a complete reaction between the precursors. A period of 6 hours permits good homogenization. A material $BPO_4$ is obtained, in crystalline or amorphous form.

Tests show that $H_3BO_3$ can be replaced by $B_2O_3$. Other tests show that $NH_4H_2PO_4$ can be replaced by $P_2O_5$. All combinations between, on the one hand, $B_2O_3$ and $H_3BO_3$, and on the other hand, $P_2O_5$ and $NH_4H_2PO_4$, are effective. Other precursors or combinations of precursors can therefore be considered.

The material $BPO_4$ is then cooled in air and ground in an agate mortar, producing crystallized particles of $BPO_4$ of micronic particle size distribution.

These particles of $BPO_4$ (510 mg) are mixed with β-Sn (1432 mg). The mixture is finely ground in an agate mortar and heated in a vitreous carbon boat in a horizontal furnace initially at a temperature of 500° C. under inert atmosphere (argon) for 6 hours (second heat treatment). The inert atmosphere prevents the oxidation of Sn.

Tests have shown that the temperature must be sufficiently high to form the interface between Sn and $BPO_4$, that is, higher than 230° C. (melting point of tin metal), and sufficiently low to avoid the melting of $BPO_4$, that is, lower than 800° C. Various tests have shown that the optimal range is between 300 and 600° C.

Other tests have shown that a heating time of between 4 and 8 hours permits good homogenization and a complete reaction, avoiding the growth of tin metal.

The negative electrode material obtained is cooled by quenching, under inert atmosphere to avoid oxidation, between 500° C. and ambient temperature. It is then ground in an agate mortar or by mechanical grinding in order to obtain a particle size of between and 10 μm.

The material obtained comprises an active phase Sn and a support phase $BPO_4$ (proportions 0.4 $BPO_4$/Sn). A mixed interface consisting of the elements Sn, B, P and O clearly exists between the support phase and the active phase.

Indeed, the X-ray diffraction analyses show clearly pronounced peaks revealing the existence of two crystalline phases: β-Sn (active material) and $BPO_4$ (inactive matrix) and an amorphous phase. This suggests that the active material and the inactive material partially react due to the material synthesis temperature.

Figure 1:
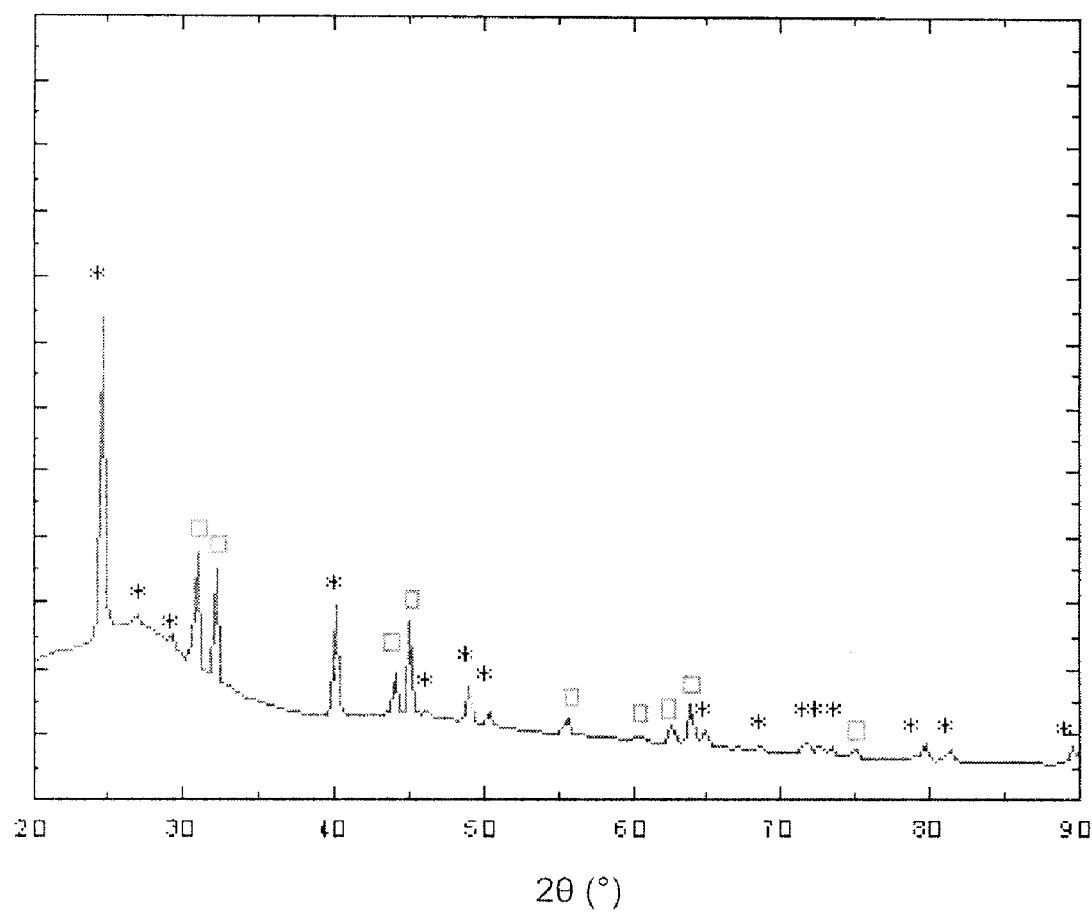
FIG. 1: Diffractogram (Cu Kα) obtained on a material according to this invention based on Sn and $BPO_4$. The peaks associated with the crystalline phases $BPO_4$ and βSn are identified respectively by asterisks and squares.

The results of these analyses are plotted in FIG. 1. On the x-axis, 2θ represents twice the diffraction angle in degrees. The pristine material can be considered as a composite material formed by the crystalline particles of β-Sn and $BPO_4$ and an amorphous phase $SnBPO_4$ at the interface between the two crystalline phases. This structure is also obtained when Sn is replaced for example by Si or Al (examples below).

Figure 2:
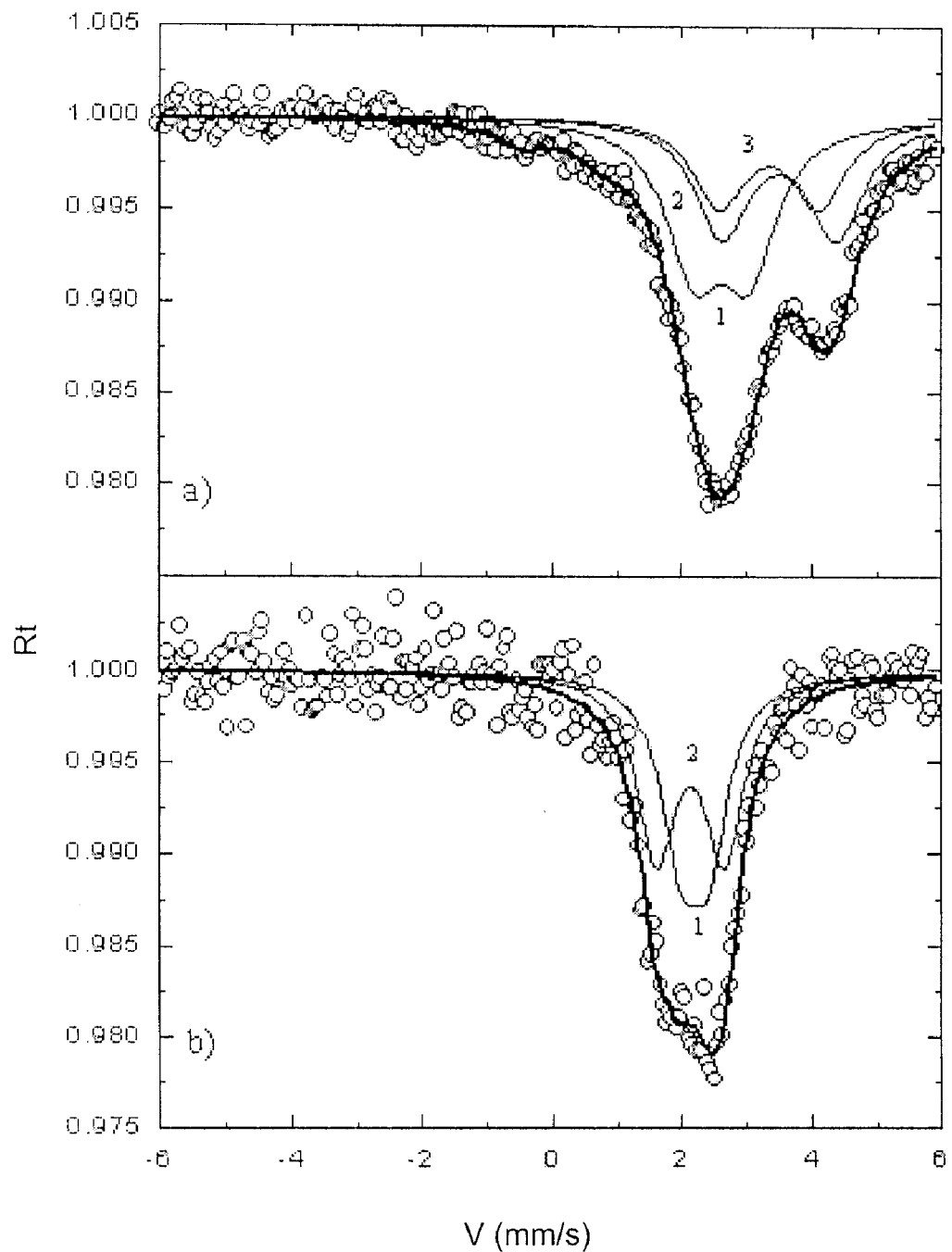
FIG. 2 (a and b): Mössbauer spectra of $^{119}Sn$ on a material according to this invention, non-lithiated (a), and at the end of the first discharge (b). The spectrum of the same material non-lithiated (a) shows the existence of Sn(0) (curve 1) and of Sn(II) in two different environments (curves 2 and 3). The components (curves 1 and 2) of the spectrum of the lithiated compound (b) can be attributed to Li—Sn alloys.

The presence of tin in the amorphous phase is confirmed by the Mössbauer spectroscopy of $^{119}$Sn. The Mössbauer spectra (FIG. 2 (a)) show the existence of two oxidation degrees for tin: Sn(0) (β-Sn) and Sn(II). The subspectra 2 and 3 associated with Sn(II) are similar to those found in the tin composite oxides (TCO), suggesting the existence of an amorphous phase of vitreous tin borophosphate as anticipated from reactions involving tin, which is a glass forming element. The subspectrum 1 associated with Sn(0) is due to βSn. The results of these analyses are plotted in FIG. 2. In this figure, "Rt" represents the relative transmittance (ratio of the intensity of the transmitted beam to the incident beam) and "V" the velocity in mm/s.

Such a microstructure differs from the composite structures based on tin examined in the prior art, which are homogenous and amorphous.

Figure 3:
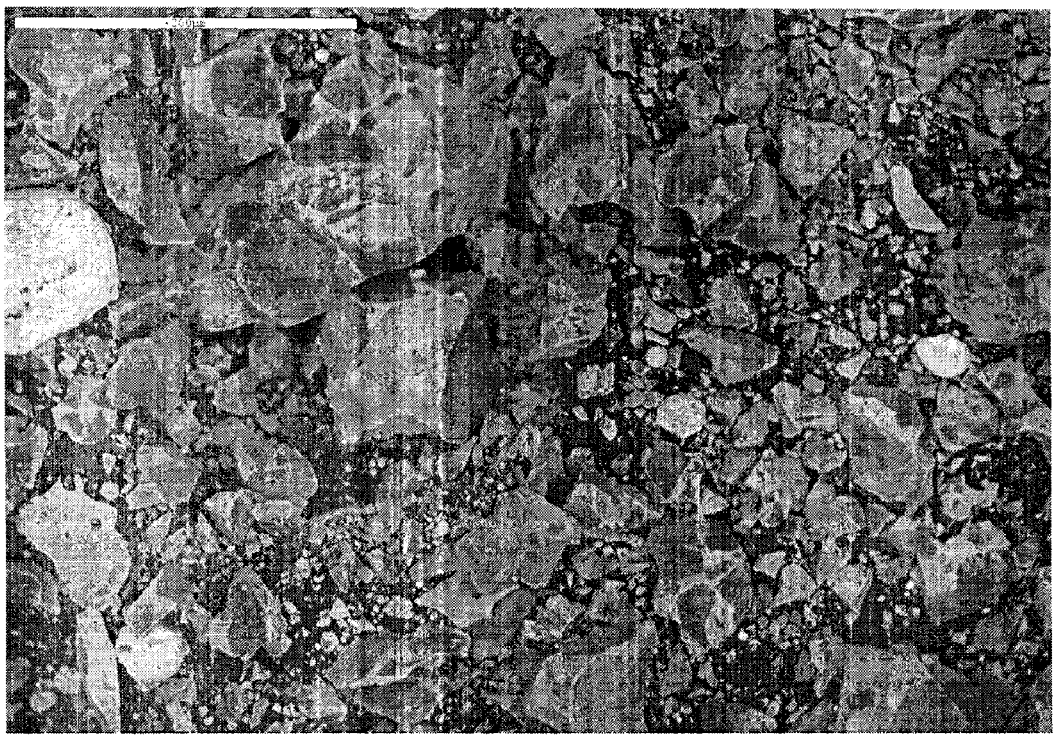
FIG. 3: Photograph obtained by scanning electron microscopy in backscattering mode of a material of this invention non-lithiated.

Electron microscope analyses reveal particles about 10 μm in diameter, and local chemical analysis reveals particles more or less rich in tin. FIG. 3 is a photograph showing a material obtained by this example. In this photograph, 1 cm corresponds to 45 μm. The light zones correspond to the richest tin zones.

Example 2

Lithium-Ion Test Battery for Electrochemical Characterisation of a Material According to the Invention These experiments were conducted with the aim of investigating the electrochemical properties of the materials obtained according to example 1.

For this purpose, mixtures of powders of the material obtained in example 1 (90% by weight) and carbon black (10% by weight) as an electron conducting anti stabilising material, were pressed into pellets. These pellets form the positive electrode.

The negative electrode is composed of a sheet of lithium.

A two-electrode electrochemical cell is formed. The electrochemical tests were performed on SWAGELOCK cells (commercial brand).

The electrolyte is a solution of ethylene carbonate and dimethyl carbonate (1:3) comprising 1 M of $LiPF_6$.

Figure 4:
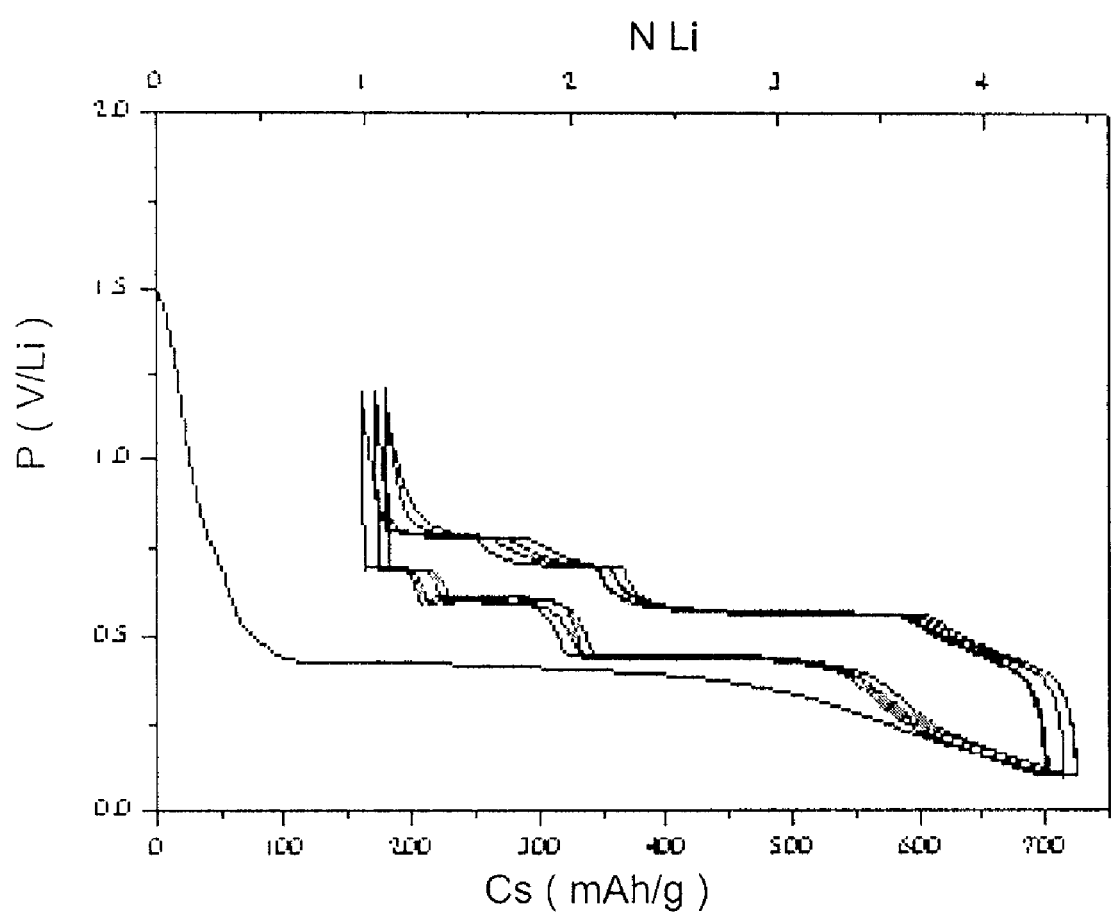
FIG. 4: Variations in the charge/discharge potential of a material $M_{2.5}BPO_4$ of the invention in the range 0.1 to 1.2 V where M=Sn. In this figure, "N Li" indicates the number of intercalated Li, "P" the potential in V with regard to the potential of lithium metal, "Cs" is the gravimetric capacitance in mAh/g.

The charge/discharge cycles of the cell were carried out in galvanostatic mode at C/20 (C=1 Li mol$^-$.h$^-$) in the potential range between 1.5 and 0.40 V with regard to lithium metal. FIG. 4A shows the charge/discharge characteristics of this cell.

During the first discharge, the potential decreases from 1.5 V to 0.4 V with the insertion of about 0.5 Li mol$^{-1}$. This low value of the potential and the Mössbauer measurements indicate the reduction of Sn(II) belonging to the vitreous (amorphous) phase to Sn(0).

The additional insertion of lithium up to 4.2 Li mol$^{-1}$ then leads to the formation of Li—Sn alloys as shown by the Mössbauer spectrum obtained at the end of the first discharge in appended FIG. 2(b).

The extraction of Li from these Li—Sn alloys during the first charge shows a potential curve formed of three clearly defined plateaux corresponding to two-phase reactions involving $Li_xSn$ crystalline phases as observed in the prior art for βSn, but with the material of this invention, the reaction is reversible.

The reversible capacitance observed is about 550 mAh/g. This capacitance is close to that obtained for the amorphous composites of tin TCO (about 600 mAh/g) but the irreversible loss in the first cycle of 160 mAh/g is lower than that of TCO (about 400 mAh/g).

The results obtained confirm the superiority of the compounds of this invention with regard to TCO of the prior art, particularly concerning reversibility (specific capacitance).

The cyclic retention behaviour of the materials of this invention at 10 cycles is greater than 98%.

Example 3

Production of a Material According to the Invention Based on Si and $BPO_4$

This example allows the production of a material according to the invention in which the active phase consists of Si and the support phase is $BPO_4$. In this example, the proportions are 0.4 $BPO_4$/Si.

The method employed is that of example 1. The proportions of Si and $BPO_4$ are respectively 797 mg and 1203 mg.

Electrochemical curves comparable to those of tin are obtained.

The material obtained is tested as in example 2. It comprises an active phase Si and a support phase $BPO_4$ (proportions 0.4 $BPO_4$/Si).

The results confirm the superiority of the compounds of this invention over the TCO, particularly concerning reversibility.

Example 4

Production of a Material According to the Invention Based on Al and $BPO_4$

This example allows the production of a material according to the invention in which the active phase consists of Al and the support phase is $BPO_4$. In this example, the proportions are 0.4 $BPO_4$/Al.

The method employed is that of example 1. The proportions of Al and $BPO_4$ are respectively 779 mg and 1225 mg.

Electrochemical curves comparable to those of tin are obtained.

The material obtained is tested as in example 2. It comprises an active phase Al and a support phase $BPO_4$ (proportions 0.4 $BPO_4$/Al).

The obtained results confirm superiority of the compounds of this invention over the TCO of the prior art, particularly concerning reversibility.

Example 5

Method for Producing a Lithium-Ion Battery Using the Material of this Invention

The material produced in example 1, 3 or 4 is used to produce a negative electrode.

Figure 5:
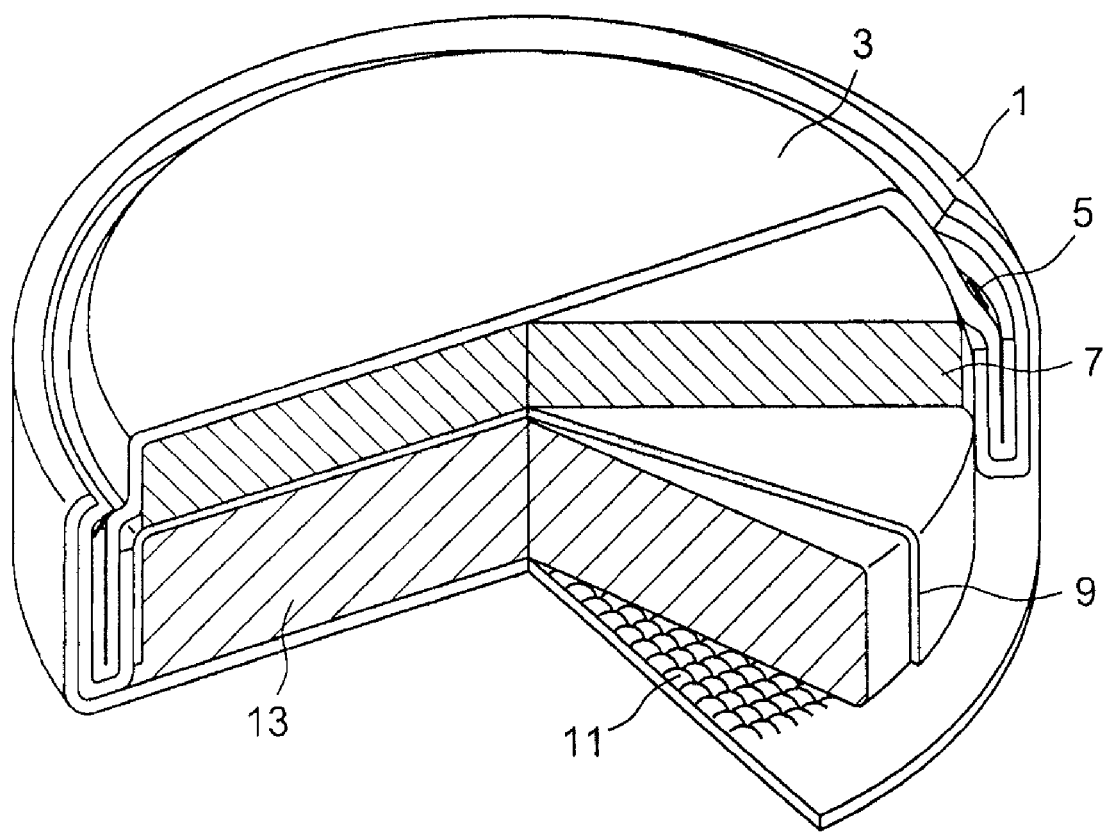
FIG. 5: Diagram of an example of a lithium-ion battery using a material of the invention as a negative electrode material.

This example shows the use of negative electrode materials according to this invention, in a device in the form of a button battery, of standard manufacture, of which the diagram is given in appended FIG. 5.

This figure shows the following: a positive can (1), a negative cell terminal (3), an insulating grommet separating the two terminals (5), an anode (7), a separator (9), a cathode collector (11) and a cathode (13). These components together constitute a lithium-ion battery in the form of a button battery.

The negative electrode of the lithium-ion battery was prepared by the polyvinylidene fluoride-N-methyl-2-pyrrolidone method (PVDF-NMP) with the following composition: 86% of active material of the invention (Sn, Al or Si and $BPO_4$), 6% of polyvinylidene fluoride (PVDF), 8% of a mixture of carbons: 4% of very pure carbon obtained from acetylene black (reference Y50A sold by Noir d'Acétylène de l'Aubette) and 4% of graphite (reference $UF_2$ sold by Graphit Kropfmühl AG) and N-méthyl-2-pyrrolidone (NMP) as solvent.

The electrolyte is $LiPF_6$ (1M) propylene carbonate/ethylene carbonate/dimethyl carbonate (PC/EC/3DMC in proportions 1:1:3) and the positive electrode material has the formula $LiCoO_2$.

Figure 6:
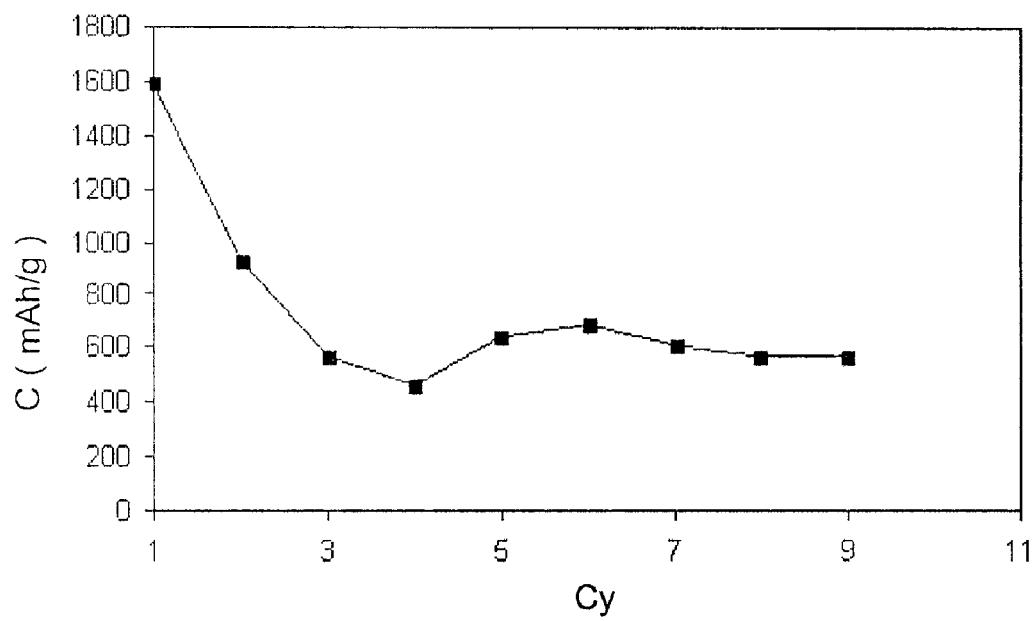
FIG. 6: Variations of the mass capacitance as a function of the number of charge/discharge cycles for lithium-ion battery using a material of the invention as negative electrode material. In this figure "C" represents the gravimetric capacitance in mAh/g and "Cy" the number of cycles.

The potential difference across the terminals of the lithium-ion battery is between 3.5 and 4V and the reversible capacitance is stabilised at 600 mAh/g (FIG. 6).

In this figure, "C" represents the gravimetric capacitance mAh/g which is plotted as a function of the number of cycles ("Cy").

Example 6

Production of a Material According to the Invention Based on Sn, Si and $BPO_4$ In this example, a material according to the invention is produced in which the active phase consists of a mixture of Sn and Si and the support phase is $BPO_4$. The molar proportions are 0.5 $BPO_4$/0.5 Sn, 0.5 Si.

The method employed is the one described in example 1. The proportions of Sn, Si and $BPO_4$ are respectively 940 mg, 222 mg and 838 mg.

The material obtained comprises an active phase consisting of a mixture of Sn and Si and a support phase $BPO_4$ (molar proportions 0.5 $BPO_4$/0.5 Sn, 0.5 Si). A mixed interface consisting of the elements Sn, B, P and O clearly exists between the support phase and the active phase.

Figure 7:
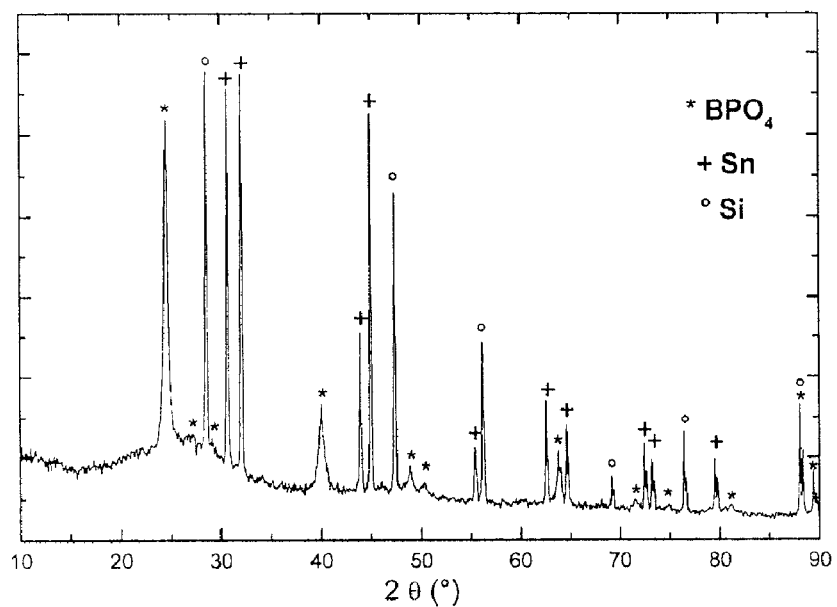
FIG. 7: Diffractogram (Cu Kα) obtained on a material according to this invention based on Sn, Si and $BPO_4$. The peaks associated with the crystalline phases $BPO_4$, Sn and Si are identified respectively by asterisks, crosses and circles.

The X-ray diffraction analyses, plotted in FIG. 7, clearly reveal the existence of three crystallized phases β-Sn (active phase), Si (active phase) and $BPO_4$ (inactive phase).

Figure 8:
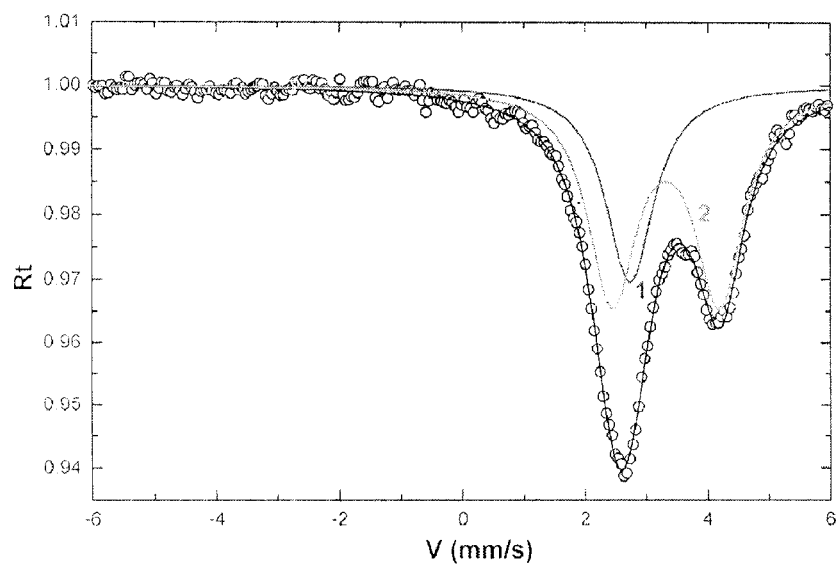
FIG. 8: Mössbauer spectrum of $^{119}Sn$ of a material according to this invention based on Sn, Si and $BPO_4$. The spectrum shows the existence of $Sn^0$ (subspectrum 1) and $Sn^{II}$ (subspectrum 2).

As for example 1, the presence of tin in the amorphous phase is confirmed by the Mössbauer spectroscopy of $^{119}Sn$ shown in FIG. 8.

The material tested as in example 2 has a reversible capacitance of about 650 mAh/g.

Figure 9:
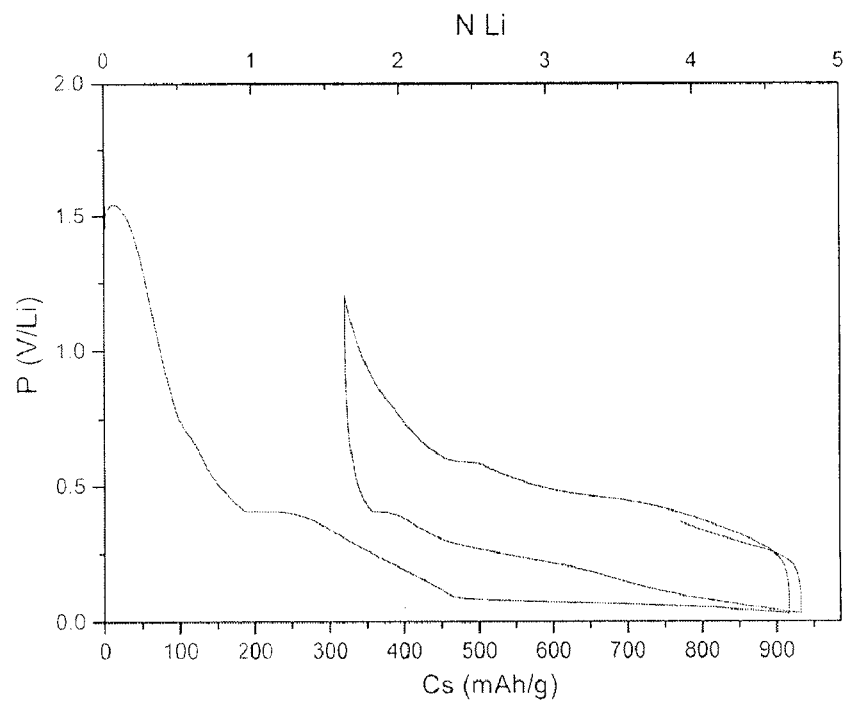
FIG. 9: Variations in the charge/discharge potential of a material according to this invention based of Sn, Si and $BPO_4$, in the range 0.1 to 1.2 V. In this figure, "N Li" indicates the number of intercalated Li, "P" the potential in V with regard to the potential of lithium metal, "Cs" is the gravimetric capacitance in mAh/g.

FIG. 9 shows the charge/discharge characteristics of such a cell.

Example 7

Production of a Material According to the Invention Based on Sn and $CaSiO_3$ In this example, a material according to the invention is produced in which the active phase consists of Sn and the support phase is $CaSiO_3$. The molar proportions are 0.4 $CaSiO_3$/1 Sn.

The synthesis of the support phase $CaSiO_3$ is carried out by the sol-gel method using the precursors $Si(OC_2H_5)_4$ and $Ca(NO_3), 4H_2O$. The gel form is then dried in the oven at 80° C., then calcined at 1100° C. for 4 hours. The material is then synthesised by a method similar to the one described in example 1.

The proportions of Sn, and $CaSiO_3$ are respectively 1437 mg and 563 mg. The mixture is finely ground in an agate mortar and then heated in an aluminium boat at 500° C. under inert atmosphere (argon) for ½ hour, and then at 850° C. for 7 hours.

The material obtained comprises an active phase consisting of Sn and a support phase $CaSiO_3$ (molar proportions 0.4 $CaSiO_3$/1 Sn). A mixed interface consisting of the elements Ca, Sn, Si, and O clearly exists between the support phase and the active phase.

Figure 10:
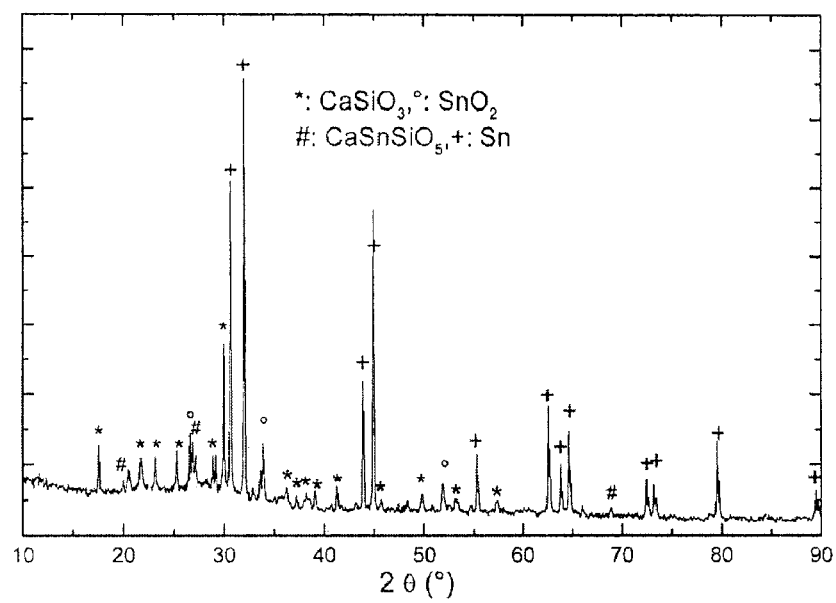
FIG. 10: Diffractogram (Cu Kα) obtained on a material according to this invention based on Sn and $CaSiO_3$. The peaks associated with the crystalline phases $CaSiO_3$, $SnO_2$, $CaSnSiO_5$ and Sn are identified respectively by asterisks, circles, pound symbols and crosses.

The X-ray diffraction analyses, plotted in FIG. 10, clearly reveal the existence of three crystallized phases: β-Sn (active phase), $CaSiO_3$ (inactive phase) and a more complex vitroceramic interface comprising crystalline particles of $SnO_2$ and $CaSiSnO_5$ in an amorphous phase.

Figure 11:
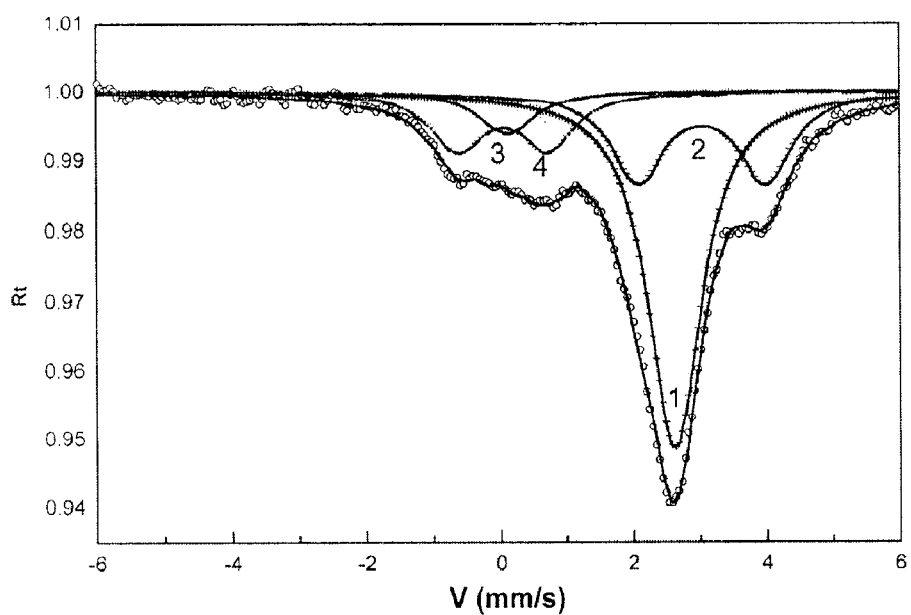
FIG. 11: Mössbauer spectrum of $^{119}Sn$ of a material according to this invention based on Sn and $CaSiO_3$. The spectrum shows the existence of $Sn^0$ (subspectrum 1), $Sn^{II}$ (subspectrum 2), $SnO_2$ (subspectrum 3) and $CaSnSiO_5$ (subspectrum 4).

The Mössbauer spectrum shown in FIG. 11 permits the identification of the various phases. The subspectrum 1 characterises the active phase β Sn. The presence of tin in the amorphous phase is confirmed by the presence of the subspectrum 2. The subspectra 3 and 4 are characteristic of $SnO_2$ and $CaSiSnO_5$.

Figure 12:
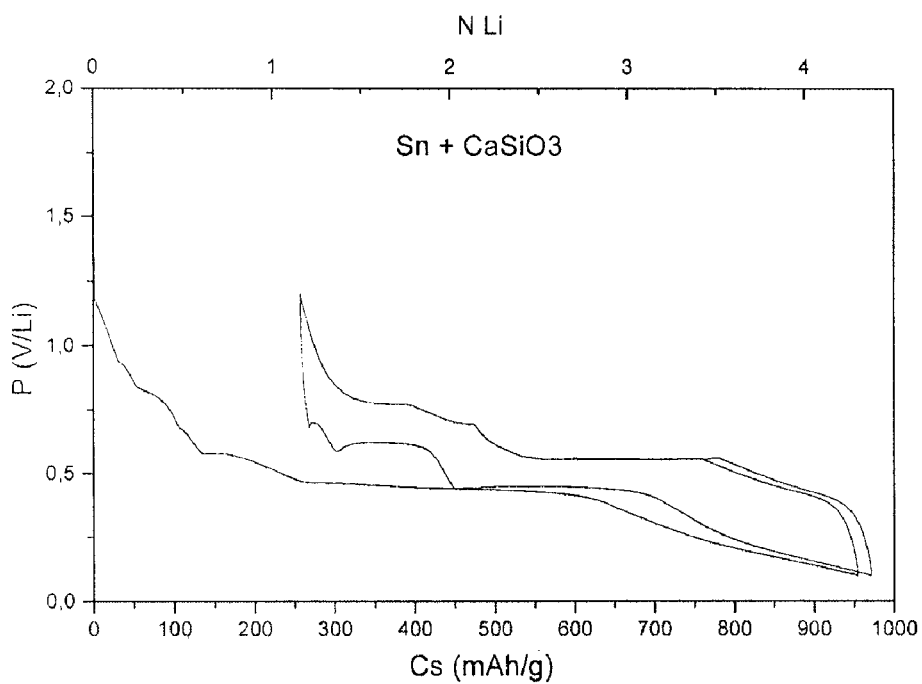
FIG. 12: Variations in the charge/discharge potential of a material according to this invention based on Sn and $CaSiO_3$ in the range 0.1 to 1.2 V. In this figure, "N Li" indicates the number of intercalated Li, "P" the potential in V with regard to the potential of lithium metal, "Cs" is the gravimetric capacitance in mAh/g.

The material tested as in example 2 has a reversible capacitance of about 650 mAh/g. FIG. 12 shows the charge/discharge characteristics of such a cell.

Example 8

Production of a Material According to the Invention Based on Sn, Si and $CaSiO_3$ In this example, a material according to the invention is produced in which the active phase consists of a mixture of Sn and Si and the support phase is $CaSiO_3$. The molar proportions are 1 $CaSiO_3$/1 Sn, 1 Si.

The method used is the one described in example 7. The proportions of Sn, Si and $CaSiO_3$ are respectively 903 mg, 214 mg and 883 mg.

The material obtained comprises an active phase consisting of a mixture of Sn and Si and a support phase $CaSiO_3$ (molar proportions 1 $CaSiO_3$/1 Sn, 1 Si) and a mixed interface consisting of the elements Ca, Sn, Si, and O.

Figure 13:
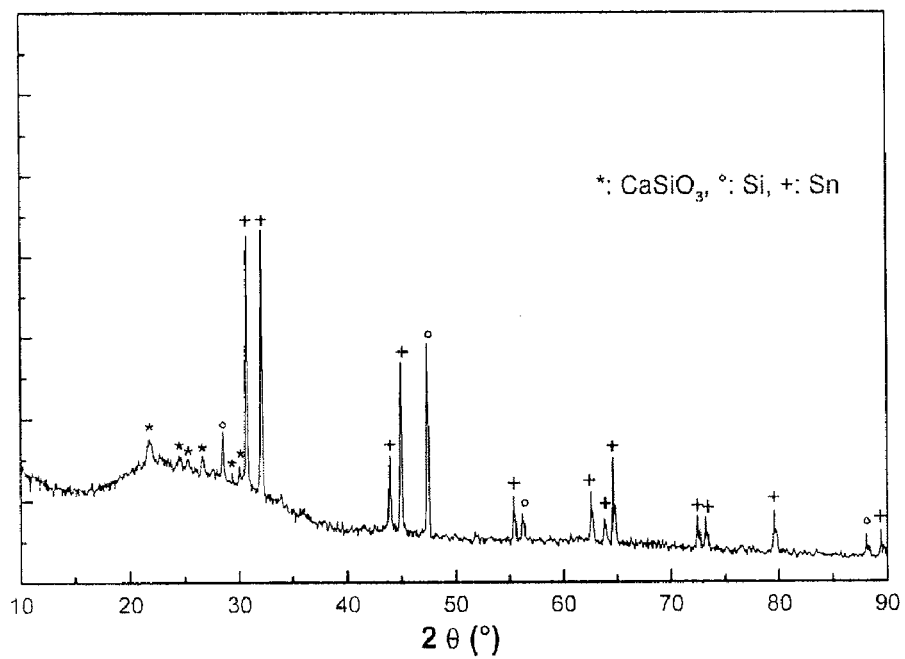
FIG. 13: Diffractogram (Cu Kα) obtained on a material according to this invention based on Sn, Si and $CaSiO_3$. The peaks associated with the crystalline phases $CaSiO_3$, Si and Sn are identified respectively by asterisks, circles and crosses.

The X-ray diffraction analyses, plotted in FIG. 13, clearly reveal the existence of three crystalline phases: β-Sn (active phase), Si (active phase) and $CaSiO_2$ (inactive phase).

The material tested as in example 2 has a reversible capacitance of about 750 mAh/g.

Figure 14:
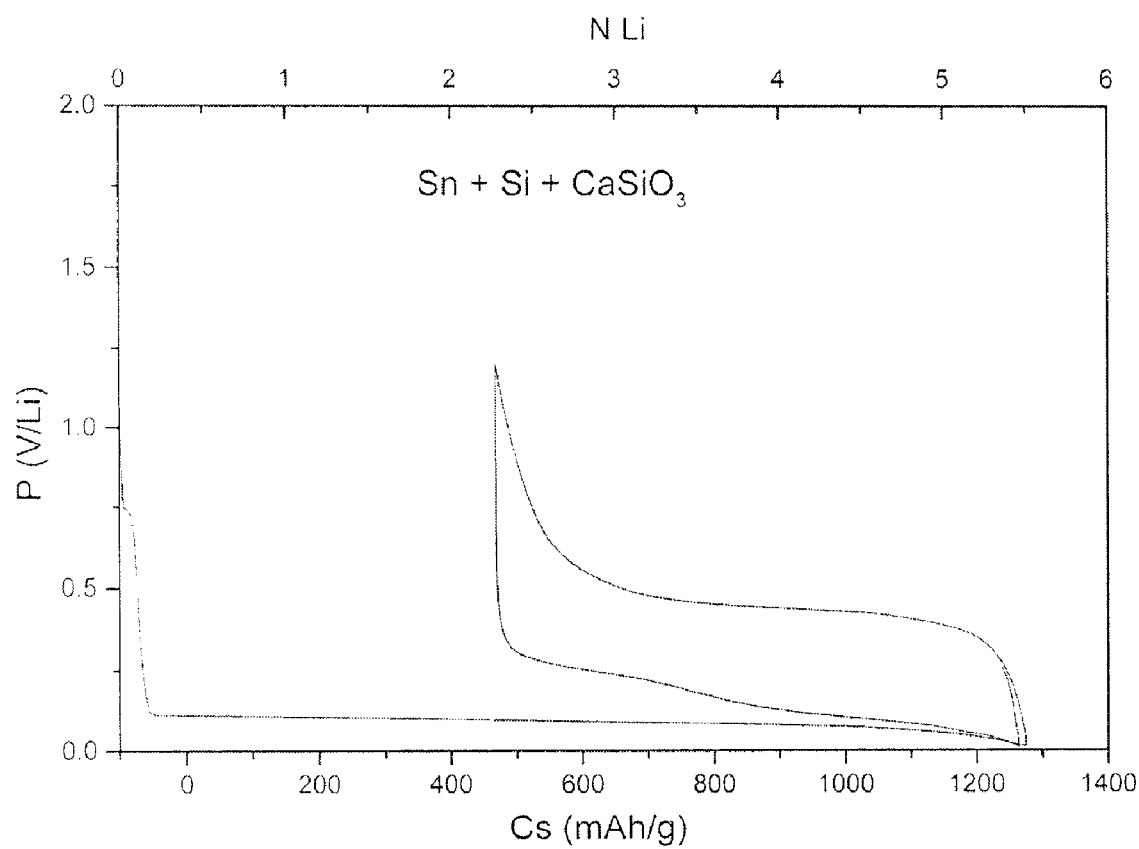
FIG. 14: Variations in the charge/discharge potential of a material according to this invention based on Sn, Si and $CaSiO_3$ in the range 0.1 to 1.2 V. In this figure, "N Li" indicates the number of intercalated Li, "P" the potential in V with regard to the potential of lithium metal, "Cs" is the gravimetric capacitance in mAh/g.

FIG. 14 shows the charge/discharge characteristics of such a cell.

LIST OF REFERENCES

[1] J. O. Besenhard and al. in *J. Power Sources* 68 (1997) 87.
[2] EP-A-0 651 450—Y. Idota and al.
[3] Y. Idota and al., *Science* 276 (1997) 1395.
[4] I. A. Courney and al., *J. Electrochem. Soc.* 146 (1999) 59.
[5] G. R. Goward and al., *J. Mater. Chem.* 10 (2000) 3241.
[6] J. Chouvin and al., *Solid State Sciences* 6 (2004) 39.
[7] M. Winter and J. O. Besenhard, *Electrochemica Acta* 45 (1999) 31.

The invention claimed is:
1. A negative electrode material comprising an active phase consisting of a material M based on a material selected from the group consisting of Al, Si, Sn, Sb and a mixture thereof, and an electrochemically active support phase consisting of a material $X_aY_bO_c$, wherein:

O is an oxygen;

Y is a cation with oxidation degree m=3, 4, 5 or 6;

X is a cation with oxidation degree d=1, 2, 3, 4 or 5, X ensuring the electroneutrality of $X_aY_bO_c$; and where:

c is such that $2 \leq c \leq 10$;

b is such that $1 \leq b \leq 4$; and a=(2c−bm)/d;

an interface of mixed composition existing between the active phase and the support phase and formed by the material M reacting chemically with $X_aY_bO_c$, the said interface consisting of the elements M, X, Y and O, the material M being in a metallic form of the metal and presenting an oxidation state of 0.

2. The electrode material according to claim 1, wherein Y is selected from the group consisting of $B^{III}$, $Al^{III}$, $Si^{IV}$, $Ge^{IV}$, $P^V$, $Sb^V$, $S^{VI}$ and a combination thereof.

3. The electrode material according to claim 1, wherein the following is (are) present:
(i) anionic complexes having the formula $(Y_bO_c)^n$ based on tetrahedral units $YO_4$, where n=bm−2c$\leq$0 with $1 \leq b \leq 4$, with m, the oxidation degree of Y, equal to 3, 4, 5 or 6, and with $2 \leq c \leq 10$; and/or
(ii) continuous mono- bi- or three-dimensional continuous lattices formed of infinite sequences of anionic entities $(Y_bO_c)^n$, with Y, b, c and n as defined above.

4. The electrode material according to claim 1, wherein X is a cation selected from the group consisting of an alkaline element, an alkaline earth element, a transition element having an oxidation degree between 1 and 5, an element p having an oxidation degree of 3 or 5, and a combination thereof.

5. The electrode material according to claim 1, wherein the molar proportion $[M]/[X_aY_bO_c]$ is between 0.1 and 100.

6. The electrode material according to claim 1, wherein, in the material M, the elements Al, Si, Sn and Sb are combined with carbon in a molar proportion of up to 1:1.

7. A negative electrode of a rechargeable lithium-ion battery, characterized by being formed of a negative electrode material according to claim 1.

8. A rechargeable lithium-ion battery comprising at least one positive electrode, at least one negative electrode, and an electrolyte, the said battery being characterized in that the said at least one negative electrode comprises a negative electrode material according to claim 1.

9. A material comprising an active phase M based on Sn, Si or Al or a mixture thereof in interaction with a support phase $BPO_4$, an interface of mixed composition existing between the active phase and the support phase, the said interface consisting of the elements M, B, P and O.

10. A negative electrode material comprising an active phase consisting of a material M based on a material selected from the group consisting of Al, Si, Sn, Sb and a mixture thereof, and a support phase consisting of a material $X_aY_bO_c$, wherein:

O is an oxygen;

Y is a cation with oxidation degree m=3, 4, 5 or 6;

X is a cation with oxidation degree d=1, 2, 3, 4 or 5, X ensuring the electroneutrality of $X_aY_bO_c$; and where:

c is such that $2 \leq c \leq 10$;

b is such that $1 \leq b \leq 4$; and a=(2c−bm)/d;

an interface of mixed composition existing between the active phase and the support phase, the said interface consisting of the elements M, X, Y and O, wherein, in the material M, the elements Al, Si, Sn and Sb are combined with carbon in a molar proportion of up to 1:1.

11. The material according to claim 10, wherein Y is selected from the group consisting of $B^{III}$, $Al^{III}$, $Si^{IV}$, $Ge^{IV}$, $P^V$, $Sb^V$, $S^{VI}$ and a combination thereof.

12. The material according to claim 10, wherein the following is (are) present:
(i) anionic complexes having the formula $(Y_bO_c)^n$ based on tetrahedral units $YO_4$, where n=bm−2c$\leq$0 with $1 \leq b \leq 4$, with m, the oxidation degree of Y, equal to 3, 4, 5 or 6, and with $2 \leq c \leq 10$; and/or
(ii) continuous mono- bi- or three-dimensional continuous lattices formed of infinite sequences of anionic entities $(Y_bO_c)^n$, with Y, b, c and n as defined above.

13. The material according to claim 10, wherein X is a cation selected from the group consisting of an alkaline element, an alkaline earth element, a transition element having an oxidation degree between 1 and 5, an element p having an oxidation degree of 3 or 5, and a combination thereof.

14. The material according to claim 10, wherein the molar proportion $[M]/[X_aY_bO_c]$ is between 0.1 and 100.

15. A negative electrode of rechargeable lithium-ion battery, characterized by being formed of a material according to claim 10.

16. A rechargeable lithium-ion battery comprising at least one positive electrode, at least one negative electrode, and an electrolyte, the said battery being characterized in that the said at least one negative electrode comprises a negative electrode material according to claim 10.

* * * * *

UNITED STATES PATENT AND TRADEMARK OFFICE
CERTIFICATE OF CORRECTION

PATENT NO. : 8,062,561 B2  Page 1 of 1
APPLICATION NO. : 11/572889
DATED : November 22, 2011
INVENTOR(S) : Jumas et al.

It is certified that error appears in the above-identified patent and that said Letters Patent is hereby corrected as shown below:

On the Title Page
Item (56) FOREIGN PATENT DOCUMENTS, Page 2, add --EP 0 651 450 10/1994--.

Signed and Sealed this
Twenty-first Day of October, 2014

Michelle K. Lee
*Deputy Director of the United States Patent and Trademark Office*